United States Patent
De Groot et al.

(10) Patent No.: US 10,248,370 B2
(45) Date of Patent: Apr. 2, 2019

(54) METHOD OF CONTROLLING A PRINTING SYSTEM

(71) Applicant: Océ-Technologies B.V., Venlo (NL)

(72) Inventors: Michel De Groot, Venlo (NL); Rob Jacobs, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 15/847,685

(22) Filed: Dec. 19, 2017

(65) Prior Publication Data

US 2018/0107436 A1   Apr. 19, 2018

Related U.S. Application Data

(63) Continuation of application No. PCT/EP2016/064976, filed on Jun. 28, 2016.

(30) Foreign Application Priority Data

Jul. 3, 2015  (EP) .................................. 15175291

(51) Int. Cl.
    *G06F 3/12* (2006.01)
(52) U.S. Cl.
    CPC .......... *G06F 3/1263* (2013.01); *G06F 3/1205* (2013.01); *G06F 3/1207* (2013.01); *G06F 3/1211* (2013.01); *G06F 3/1275* (2013.01); *G06F 3/1285* (2013.01); *G06F 3/126* (2013.01)

(58) Field of Classification Search
    CPC ..................................................... G06F 3/1263
    USPC ..................................... 358/1.15, 1.13, 1.14
    See application file for complete search history.

(56) References Cited

U.S. PATENT DOCUMENTS

| | | | |
|---|---|---|---|
| 2002/0135792 A1 | 9/2002 | Sommer et al. | |
| 2007/0177189 A1* | 8/2007 | German | G06F 3/1208 358/1.15 |
| 2009/0080019 A1* | 3/2009 | Teshima | H04N 1/2346 358/1.15 |
| 2010/0110183 A1 | 5/2010 | Bobbitt et al. | |
| 2010/0110483 A1 | 5/2010 | Igarashi | |
| 2012/0099139 A1* | 4/2012 | Zhou | G06F 3/1211 358/1.15 |

OTHER PUBLICATIONS

International Search Report for PCT/EP2016/064976 (PCT/ISA/210) dated Aug. 2, 2016.
Written Opinion of the International Searching Authority for PCT/EP2016/064976 (PCT/ISA/237) dated Aug. 2, 2016.

* cited by examiner

*Primary Examiner* — Jacky X Zheng
(74) *Attorney, Agent, or Firm* — Birch, Stewart, Kolasch & Birch, LLP (57) ABSTRACT

A method of controlling a printing system that is arranged to process a sequence of media sheets and is operable with a finite number of different settings includes calculating a time to finish that will be needed for processing the sequence, scheduling a sequence of sheets for printing, defining a set of possible settings for processing the scheduled sequence, calculating a time to finish for each setting in the defined set, selecting the setting with the smallest time to finish, and processing the sequence with the selected setting.

18 Claims, 6 Drawing Sheets

| setting | fuse temperature | simplex/duplex mode | colour mode |
|---|---|---|---|
| 1 1 1 | 1 | simplex | colour |
| 1 1 2 | 1 | simplex | black/white |
| ⋮ | ⋮ | ⋮ | ⋮ |

METHOD OF CONTROLLING A PRINTING SYSTEM

CROSS REFERENCE TO RELATED APPLICATIONS

This application is a Continuation of International Application No. PCT/EP2016/064976, filed on Jun. 28, 2016, and for which priority is claimed under 35 U.S.C. § 120. PCT/EP2016/064976 claims priority under 35 U.S.C. § 119 to Application No. 15175291.2, filed in Europe on Jul. 3, 2015. The entirety of each of the above-identified applications is expressly incorporated herein by reference.

BACKGROUND OF THE INVENTION

1. Field of the Invention

The invention relates to a method of controlling a printing system that is arranged to process a sequence of media sheets and is operable with a finite number of different settings, the method comprising a step of calculating a time to finish that will be needed for processing the sequence.

2. Background of the Invention

A printing system typically comprises a number of functional components, e.g. one or more print stations and a media management system for timely supplying media sheets, which may be of different types and have different properties, to the print station and for discharging the printed sheets. Some of these components may be capable of operating in different modes which are determined by corresponding setting parameters. For example, the media management system may be set to operate in either a simplex mode or a duplex mode, and/or different colour modes may be available for printing in black only, in a multicolour mode or a full colour mode. When a fuse station is used for fixing an image on the media sheets, different modes of operation may also be distinguished by different operation temperatures to which the fuse station has been set. Depending on settings, different conveying speeds of the media sheets may need to be selected.

US 2002135792 A1 describes a printing system which is capable of calculating and displaying to the user a "time to finish" for a print job that has been entered, so that the user will know in a advance how long she has to wait until her job will be completed. The time to finish is composed of print times which are needed for printing an image on an individual sheet, and of necessary inter-sheet time gaps, i.e. time intervals that separate the end of a print operation for one page from the start of a print operation for the next page. The print times are generally determined by the operating speed of the print station (or stations) and possibly also by the specific contents of the images to be printed. The inter-sheet time gaps must have a certain length in order to prevent the successive sheets from colliding with one another. More extended time gaps may be needed for example when the sheet transport path includes switches for directing the sheets to different destinations. In that case, a time gap of a certain length is necessary for operating the switch after the previous sheet has passed and before the next sheet arrives. Similarly, when the sequence of sheets includes two or more different media types which require specific adjustments of certain functional components, e.g. an adjustment of a print heat or print station, extended time gaps may be needed for making the necessary adjustments. Such extended times may also be referred to as setup times and transition times for transiting between different operational modes.

Naturally, the time to finish will depend upon the mode of operation to which the printing system has been set for processing the job. For example, printing in a duplex mode may take more time than printing in a simplex mode. Conversely, when a higher operating temperature is set for the fuse station, the sheets may pass the fuse station at a higher speed, so that the time to finish will be shortened. On the other hand, if the scheduled sequence of sheets includes a sheet of a media type that does not tolerate the high fuse temperature, a long inter-sheet time gap may be needed in order to adjust the fuse temperature for this sheet. When such events occur relatively frequently in the scheduled sequence, it may be more efficient to leave the fuse station always in a low temperature mode.

US 2010110483 A1 discloses a printing system which can be switched between a simplex mode and an interleaved duplex mode. When the system is in the duplex mode and then a number of simplex copies have to be made, a choice between different possible strategies has to be made. According to one strategy, the duplex loop is emptied first, and then the system is switched to the simplex mode. According to another strategy, the machine is left in the duplex mode and some of the simplex copies are allowed to pass idly through the duplex loop. The cited document proposes an algorithm for minimizing the time to finish for the mixed sequence of simplex and duplex copies.

US 2007/177189 A1 discloses a printing system capable of processing a plurality of job streams and sub-jobs within a stream, wherein a job scheduler determines a schedule for processing queued print sub-jobs of a job stream using a utility function which may aim at optimizing productivity.

SUMMARY OF THE INVENTION

It is an object of the invention to provide a method that permits to enhance the productivity of a printing system under a larger variety of circumstances.

In order to achieve this object, the method according to the invention comprises the steps of:
a) scheduling a sequence of sheets for printing;
b) defining a set of possible settings for processing the scheduled sequence;
c) calculating a time to finish for each setting in the defined set;
d) selecting the setting with the smallest time to finish; and
e) processing the sequence with the selected setting.

According to the invention, all settings of the printing system that could reasonably be used processing the scheduled sequence are analysed with respect to their impact on the time to finish, and then the most efficient setting will be selected to determine the mode of operation of the printing system. In this way, whenever the capabilities of the printing system, the properties of the media sheets and the specifications in a print job, do not determine the settings completely but leave a certain freedom of choice, the control system will automatically find a setting that results in an increased productivity.

It should be observed here that the step (e) "processing the sequence with selected setting" does not necessarily mean that all the sheets of the sequence are actually processed in the same mode of operation. As has been explained above in the example that related to the selection of the fuse temperature, the sequence may contain certain media sheets that impose certain constraints on the settings, and then of course the setting parameters that are dictated by these constraints will have priority over the general setting that has been selected in step (d). For all other sheets in the sequence, however, i.e. for the sheets where there is still a freedom of choice, the setting selected in step (d) (which may also be considered as a "default" setting) will prevail.

More specific optional features of the invention are indicated in the dependent claims.

In a preferred embodiment, a certain number b of sheets will be scheduled as a "buffer" before the first sheet is actually being processed. A larger buffer, i.e. a large number b, will generally result in more significant improvements in productivity. On the other hand, if the buffer is too large, this may be inconvenient because the first user, who has started the print run, will have to wait relatively long until her job starts to be processed. It is therefore preferred to work with a variable buffer. The buffer will be relatively small at machine start-up and the size will be increased when more print orders line up in the print queue.

The size of the buffer is not necessarily equal to the total number of pages to be printed in a single print job. The buffer may be smaller than a single print job but may also contain a plurality of print jobs, depending on the size of the print jobs. When more than one print job is waiting in the print queue, it will be desirable to adjust the size of the buffer such that the buffer boundary will not bisect a print job, at least when the print job is not too large.

In the scheduling process, it may also be useful to search for repetitive patterns in the job specifications. For example, when a job consists of printing copies of a six page simplex document and each copy comprises a cover sheet of a first media type and five sheets of another media type, then the pattern of changes between the two media types will be repeated every six sheets, i.e. the six sheets constitute a repetitive pattern. Observing such repetitive patterns will facilitate the calculation of the time to finish, because, basically, it will be sufficient to calculate the processing time for a single pattern and then to multiply by the number of repetitions. Moreover, when an optimal setting has been found for one such pattern, it will be a good strategy to apply the same setting for all repetitions of this pattern.

The method according to the invention may be performed either in a batch mode or in a continuous mode. In a batch mode, the steps (a) to (e) are applied to a batch of sheets which may for example have the size of the buffer, and then the method will be performed again for a next batch. In a continuous mode, new sheets are continuously scheduled while the printing system is running, and whenever a certain number of new sheets have been scheduled and are added to the sequence (in step (a)), the steps (b) to (e) are performed for the new sequence consisting of the sheets that had already been scheduled earlier (but have not yet been printed) and the sheets that have just been added. In this case, the method may imply that the printing system is switched to another setting "on the fly", and a set of appropriate rules may be applied for finding an appropriate moment for switching to the new setting, such that the switching operation does not delay the processing or delays it only by a time as small as possible.

Once the steps (a) to (e) have been applied to a given number of sheets, the method may also include a further step of dividing the sequence into two (or more) sub-sequences and repeating the steps (b) to (d) for each sub-sequence, and then it is decided whether it is more efficient to process the two sub-sequences with different settings or to use the setting that had originally been found for the entire sequence.

Of course, there are different possibilities to divide a longer sequence into two smaller sub-sequences, and, optionally, all these possibilities may be tested in order to find the optimal setting. It is also possible to iterate the process by dividing each sub-sequence into sub-sub-sequences, and so on.

In another embodiment, the scheduled sequence may be divided into a number (2 or more) of "runs", wherein a "run" designates a sequence of sheets that have uniform properties or constitute a repetitive pattern or a sequence of repetitions of such a pattern. Then, sub-settings may be considered for each run, and the set of possible settings for the overall sequence as defined in step (b) will comprise all possible combinations of sub-settings for the individual runs.

BRIEF DESCRIPTION OF THE DRAWINGS

Embodiment examples of the invention will now be described in conjunction with the drawings, wherein.

DETAILED DESCRIPTION OF THE PREFERRED EMBODIMENTS

Figure 1:
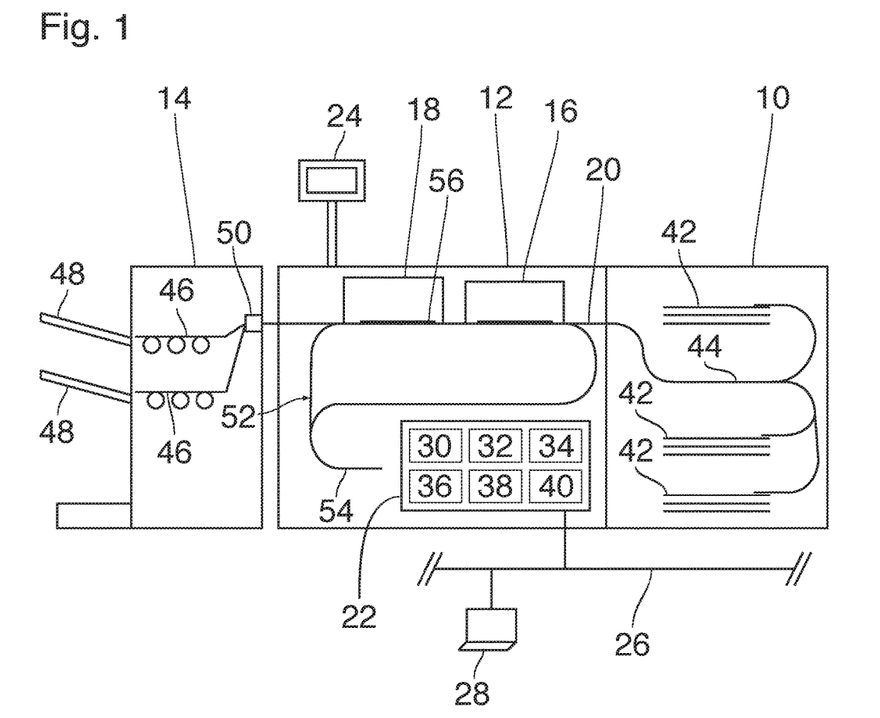
FIG. 1 is a schematic view of a printing system to which the invention is applicable.

As is shown in FIG. 1, a printing system that is described here as a representative example comprises an input section 10, a main body 12, and an output section 14. The main body 12 comprises a print station 16 and a fuse station 18 disposed at a sheet transport path 20, an electronic controller 22 and a user interface 24.

The controller 22 may be formed by a computer, a server or a workstation and is connected to all the functional components of the printing system for controlling the same and is further connected to the user interface 24 and to a network 26 via which the controller may communicate with a remote workstation 28 of a user or operator. In an alternative embodiment, the controller 22 may also be installed outside of the main body 12 for controlling the various system components via the network 26.

The hardware and/or the software of the controller 22 includes among others a print job receiving section 30, a scheduler 32, a feed control section 34, a print control section 36, an output control section 38, and a settings manager 40. The print job receiving section 30 is arranged to receive, e.g. via the network 26, print jobs each of which includes image data for one or more pages to be printed as well as various job specifications. Optionally, the image data may also be received from a local scanner whereas the job specifications are input at the user interface 24. The job specifications may include among others instructions that specify for each image to be printed the properties or type of a recording medium on which the image shall be printed.

The input section 10 includes a plurality of holders 42 each of which accommodates a stack of media sheets of a certain media type. The media types in the different holders 42 may differ in sheet thickness, sheet material, surface properties of the sheets and the like. The input section 10 further includes a feed mechanism 44 arranged to separate individual sheets from a selected one of the holders 42 and to supply them one by one into the sheet transport path 20 under the control of the feed control section 34.

When the job receiving section 30 has received a print job, the scheduler 32 determines a sequence in which the images of this print job shall be printed. For the purposes of this description, the term "image" shall designate a page size image that is to be printed onto one side of a recording sheet. The scheduler 32 further has access to a data base that stores the media types and properties of the sheets accommodated in the various holders 42. Based on the job settings that concern the media properties, the scheduler 32 selects the holders 42 from which the sheets with the desired properties are to be taken and determines a sequence in which the sheets of the different media types are to be fed into the sheet transport path 20 such that the sequence of sheets matches the sequence of images to be printed.

When the print process has been started, the feed control section 34 controls the feed mechanism 44 to supply the sheets in the sequence as scheduled into the sheet transport path 20, and the print control section 36 controls the print station 16 and the fuse station 18 so as to form a corresponding image on the top side of each sheet and to fix the image on the sheet in the fuse station.

In the example shown, the output section 14 has a plurality of holders 46 on which the sheets may be stacked after they have left the fuse station 18. When a stack, which may for example comprise a set of sheets forming a complete copy of a multi page document, has been completed, the holder 46 will forward the stack onto an associated output tray 48. In an alternative embodiment the completed stacks may also be forwarded to a finisher (not shown) for performing finishing operations such as stapling, punching and the like.

The output section 14 further includes a switch 50 which is controlled by the output control section 38 for directing each sheet to a designated one of the holders 46.

In the example shown, the main body 12 of the printing section includes also a duplex loop 52 which branches off from the sheet transport path 20 downstream of the fuse station 18, reverses the orientation of the sheets in a sheet reversing mechanism 54 and then returns the sheets upside down to the entry side of the sheet transport path 20.

A number of sheets 56 are shown in the sheet transport path 20. It should be observed however that FIG. 1 is only a schematic sketch and that, in practice, the number of sheets that can be accommodated in the sheet transport path 20 and in the duplex loop 52 may be considerably large. For example, the duplex loop 52 may be arranged to accommodate as many as 32 sheets.

Some of the components of the printing system shown in FIG. 1 provide certain setting options which permit to determine the mode of operation in which the respective component and, as a consequence, the entire printing system operates. For example, the printing system may be switched between a duplex mode, in which the duplex loop 52 is operative, and a simplex mode in which the duplex loop is idle and the printed sheets are forwarded directly from the fuse station 18 to the holder 46. As another example, the print station 16 may operate in different colour modes, e.g. a black only mode and a full colour mode. Further, the fuse station 18 may be set to operate at different fuse temperatures.

In general, the mode of operation of the printing system is determined by a vector that is called "setting" in this application. This vector has a number of components, each of which relates to another setting parameter and may assume values that are selected from a finite number of arguments.

Figure 2:
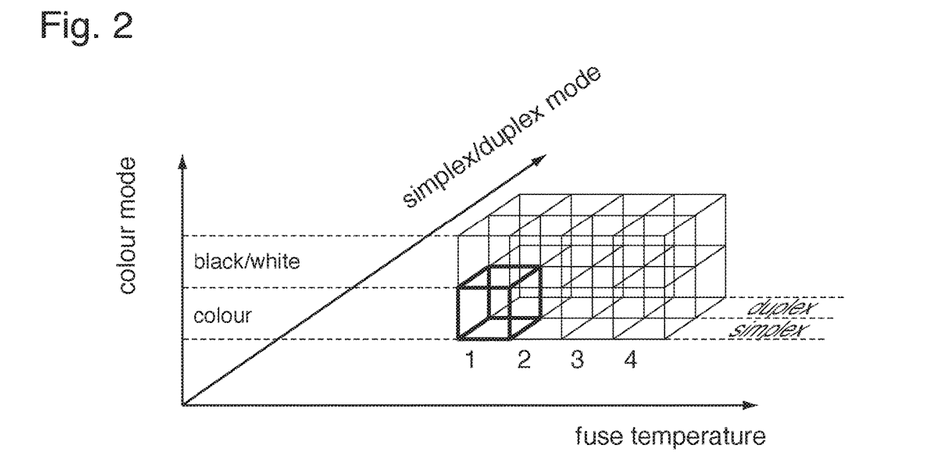
FIG. 2 is diagram illustrating a simple example of a set of possible settings for the printing system.

As a simplified example, FIG. 2 shows a three-dimensional setting space with the settings parameters "fuse temperature", "simplex/duplex mode" and "colour mode" as parameters. The fuse temperature may be set to one of four different temperature values which are simply designated here as "1", "2", "3" and "4". The component "simplex/duplex mode" may take only one of the two values "duplex" and "simplex". Similarly, the component "colour mode" may only take one of the two values "colour" and "black/white". Thus, the possible settings form a set with 4×2×2=16 different settings which are represented in FIG. 2 by a cuboid consisting of 16 cells, with each cell representing a different setting and, consequently, a specific mode of operation of the printing system.

In a practical embodiment there may of course be many more setting parameters and setting options, such as settings for finishing options, settings for the printing resolution (correlated with printing speed), and the like.

Figure 3:
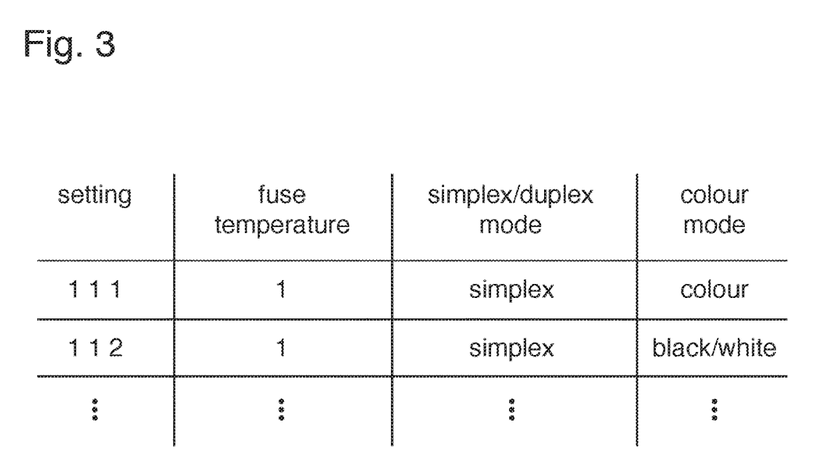
FIG. 3 shows a part of a table for different settings in the set shown in FIG. 2.

In FIG. 3, examples of two possible settings (corresponding to two cells in FIG. 2) have been indicated in a table. Each setting is designated here by a triplet of numbers forming the components of the setting vector. These settings will determine among others the time that is needed for printing a given sequence of sheets as scheduled.

The scheduler 32 is capable of calculating a time to finish for a scheduled sequence of sheets on the basis of specifications in the print job, the properties of the media sheets, the capabilities of the components of the printing system, and the selected setting. An algorithm for calculating the time to finish will now be outlined by reference to FIG. 4.

Figure 4:
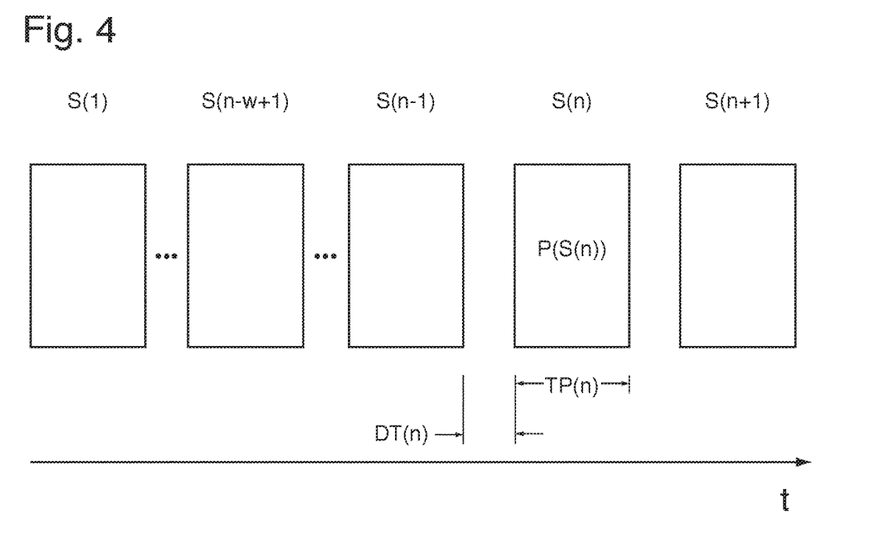
FIG. 4 is a time line diagram for a sequence of sheets to be printed.

FIG. 4 is a time line diagram showing a scheduled sequence of sheets $S(1), \ldots, S(n), n=1, \ldots, b$. The sheets are symbolized by rectangles that are arranged along a time line t. The dimension of each rectangle in the direction of the timeline t indicates a print time $TP(n)$ that is needed for forming and fixing an image on the sheet. The interval between any two successive sheets represents an inter-sheet time gap $DT(n)$ corresponding to a time interval between the time when the processing of one sheet (e.g. $S(n-1)$) ends and the processing of the next sheet ($S(n)$) starts. The time to finish can thus be calculated by summing up all the print times $TP(1), \ldots, TP(b)$ and all the inter-sheet time gaps $DT(1), \ldots DT(b)$. Note that if the printing system is idle before printing sheet $S(1)$, the inter-sheet time gap $DT(1)$ may still exist as most printing systems require a setup time before printing on a first sheet starts, for example to heat the fuser to an appropriate fusing temperature. In this particular case, this time is technically not an inter-sheet time. However, for simplicity, the term inter-sheet time will be used for these situations too.

On the basis of the specifications in the print job including specifications of media types for the sheets, and on basis of the properties of the media types, the scheduler 32 compiles a property list $P(S(n))$ for each sheet this property list may implicitly or explicitly contain certain setting constraints that apply only to the given sheet but not to the processing of the entire sequence as whole. For example, the job specifications may require that this sheet is of a media type that has specific coating and must therefore not be heated beyond a certain temperature, the certain temperature being lower than the fuse temperature "4" in FIG. 2. Consequently, all the settings with fuse temperature "4" are forbidden for this specific sheet. Another example of a setting constraint may be that the job specifications require the image on this sheet to be printed in full colour, so that all settings that specify "black/white" would also be forbidden for this sheet.

For each sheet S(n) and for a given setting of the printing system and based on the capabilities of the components of the printing system and the properties of the sheet, the scheduler 32 calculates the print time TP(n). Assuming that the sheets 56 are conveyed to the print station 16 with a certain (constant) speed, the print time will be proportional to this speed and the length of the sheet in the conveying direction. However, the conveying speed in the print station 16 can (at least in the long run) not be larger than the conveying speed in the fuse station 18. And when the fuse temperature has been set to a low value, the conveying speed must be reduced in order to provide sufficient time for fixing the image. In this way, TP(n) depends on the setting and setting constraints. Depending upon the printing technology that is used in the print station 16 and on the processing power that is available for transforming the print instructions into a raster image, the print time of TP(n) may also depend on the contents of the image to be printed. It is possible however to estimate and quantify this effect on the basis of the specified pixel coverage.

In addition to the printtime TP(n) the scheduler calculates also the inter-sheet time gap DT(n) for each sheet. This time gap may depend upon the setting in a relatively complicated way. For example, when the setting specifies duplex printing, the gaps must be large enough to allow the switches to be operated for branching a sheet from the fuse station into the duplex loop 52 and then for re-inserting it into the flow of sheets in the transport path 20. Similarly, the time required for operating the switch 50 may be relevant. The required times may be retrieved from suitable tables or a model of the printing system. In addition, it may be necessary to provide a larger time gap when adjustment operations have to be performed between the processing of the previous sheet S(n−1) and the current sheet S(n). For example, when the fuse temperature has to be changed due to different setting constraints for the sheets involved, the time gap must be large enough for the fuse station to be heated or cooled down. The properties P(S(n)) and P(S(n−1)) of the current sheet and its predecessor will be the most relevant factors influencing DT(n). Under certain circumstances, especially in a more complex scenario, DT(n) may also be influenced by the properties of the pre-predecessor, pre-predecessor and so on of the current sheet. For example, when a sheet imposes a reduction of the conveying speed, this will affect an entire section of the transport path and, consequently, also the movements of a number of preceding and subsequent sheets, resulting in changes in the special gaps and time gaps between the sheets. In this example, it is assumed that DT(n) may be affected by the properties of preceding sheets within a certain window of w sheets. In other words, DT(n) is a function of the properties P(S(n−w+1)) . . . P(S(n)).

Figure 5:
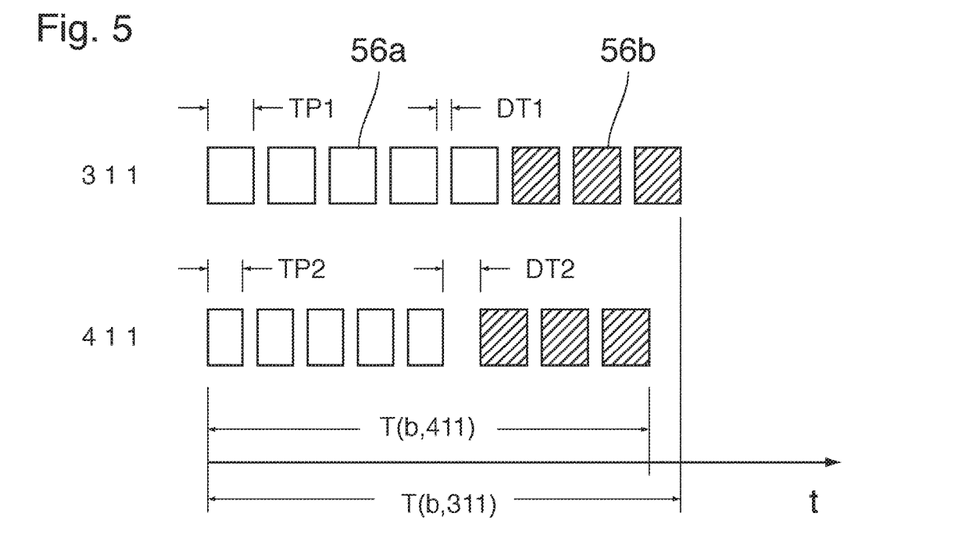
FIG. 5 shows time line diagrams for two different settings for processing a specific sequence of sheets.

FIG. 5 is a time line diagram for comparing the times to finish T(b) for two different settings (3, 1, 1) and (4, 1, 1) for a scheduled sequence of sheets 56a, 56b. The sequence comprises five successive sheets 56a of a first media type, followed by three sheets 56b of a second media type. In the setting (3, 1, 1), the fuse temperature has the value "3" which can be used for all sheets, so that all sheets will also be processed with the same speed. Consequently, the print time TP(n) has the same value TP1 for all sheets. Similarly, the inter-sheet time gaps DT(N) have the same value DT1 for all sheets. Summing up all these times gives the time to finish T(b, 3, 1, 1) for this setting.

For comparison, when the setting (4, 1, 1) is selected, the fuse temperature is set to a higher value "4", and the printing speed can be increased accordingly, resulting in shorter print times TP2. However, the sheets 56b of the second media type do not withstand this high fuse temperature, so that they must be processed with a lower fuse temperature and, accordingly, at a lower printing speed, so that the print time for these sheets is as long as in case of the setting (3, 1, 1), i. e. TP1. Moreover, the time gap TP(6) for the sixth sheet must be increased to DT2 because some time is needed for the fuse station to cool down from the fuse temperature "4" to the fuse temperature "3". Nevertheless, this effect is outweighed by the short print time TP2 for the first five sheets, so that the total time to finish T(b, 4, 1, 1) for this setting is smaller than T(b, 3, 1, 1). This means that the productivity can be increased by using the setting (4, 1, 1). It will be understood that the time savings can be remarkable when the numbers of pages to be printed are larger than in this simple example.

Figure 6:
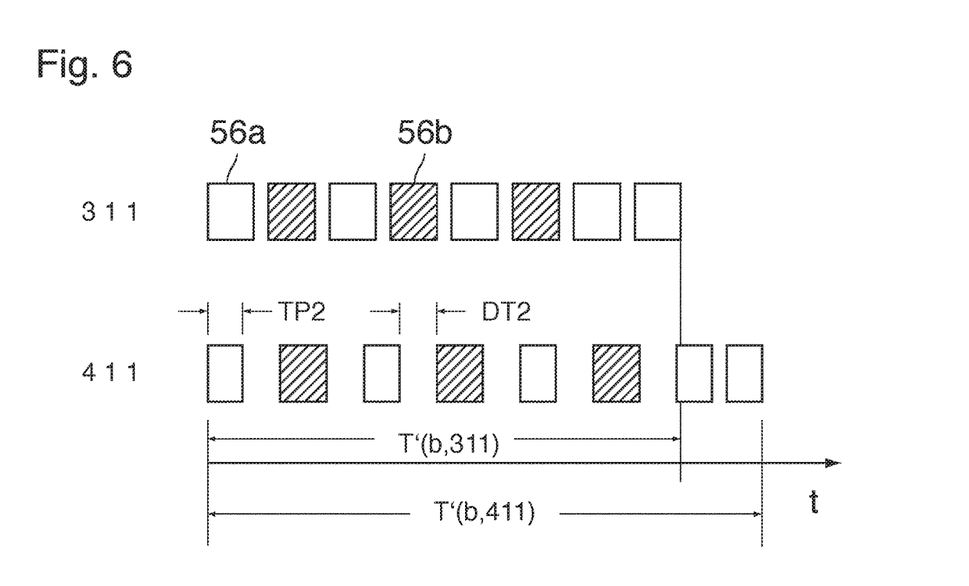
FIG. 6 is a time line diagram for the same settings as in FIG. 5, but for a different sequence of sheets.

FIG. 6 shows a time line diagram for comparing the same settings (3, 1, 1) and (4, 1, 1) for the same sheets 56a, 56b as in FIG. 5, but for the case that the sheets are scheduled for being printed in a different order. In the sequence shown in FIG. 6, the sheets 56a and 56b are alternating with one another, except for the last two sheets of the sequence which are both of the first media type. In case of the setting (3, 1, 1), the time to finish is the same as for the setting (3, 1, 1) in FIG. 5. However, when the setting (4, 1, 1) is used, the print times for the sheets 56a are shortened to TP2, as in FIG. 5, but the increased time gaps DT2 have to be used for almost all the gaps between the sheets, except for the gap between the very last two sheets. As a consequence, the time to finish T'(b, 4, 1, 1) for this setting is larger than T'(b, 3, 1, 1) so that, for this specific sequence, the change from the setting (3, 1, 1) to the setting (4, 1, 1) would not improve the productivity but would, on the contrary, delay the print process.

While only two settings have been compared in FIGS. 5 and 6, it will be understood that the other settings, using different values for the setting parameters "simplex/duplex mode" and "colour mode" should also be considered, and the resulting times to finish for all the possible settings should be compared to one another in order to optimize the productivity.

Figure 7:
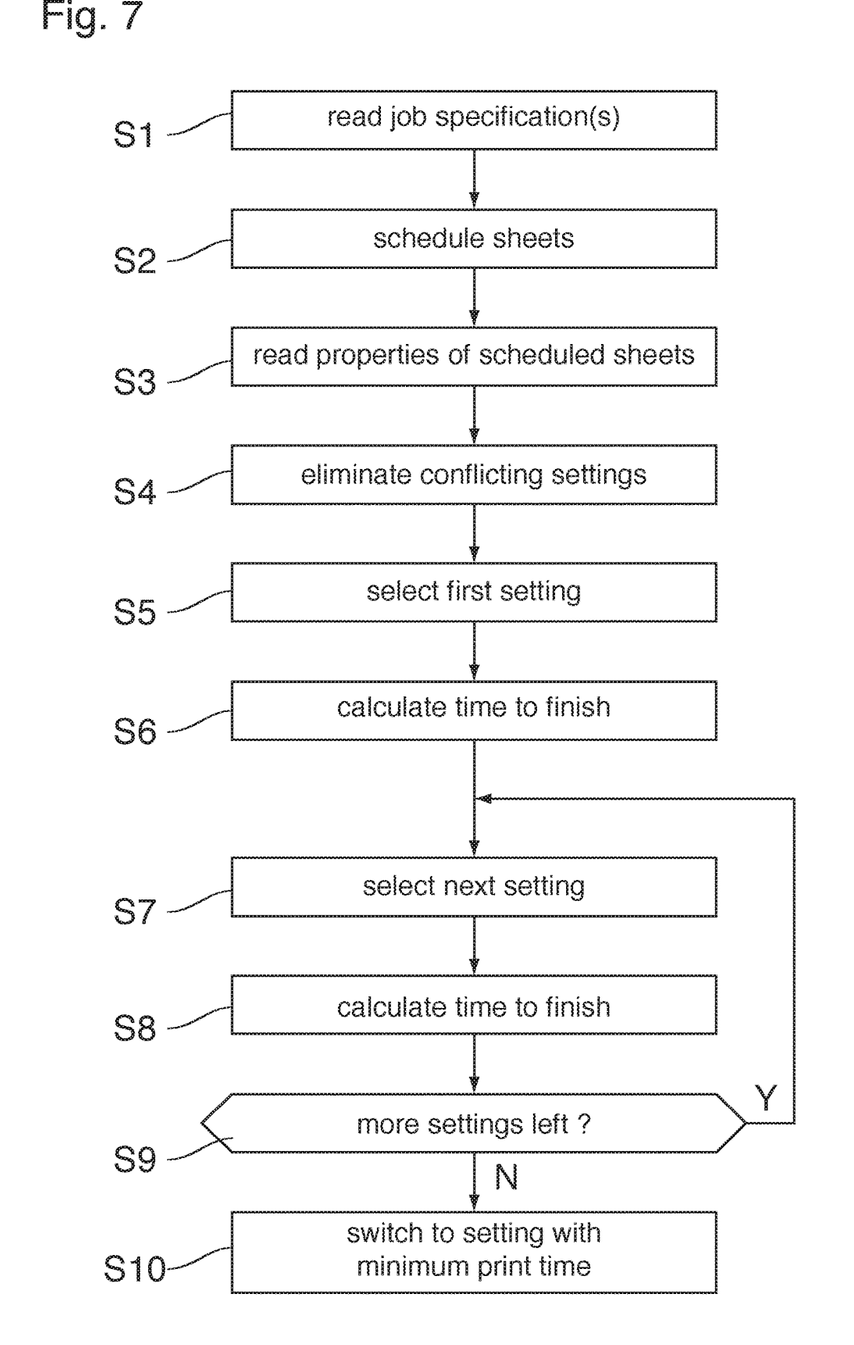
FIGS. 7 to 9 are flow diagrams illustrating embodiments of the invention.

FIG. 7 is a flow diagram illustrating the essential steps of a control method according to the invention.

In step S1, the job specifications are read in the receiving section 30. If the sheet buffer has a size of b sheets, then the job specifications for a batch of b sheets will be read in this step. Then, in step S2, these sheets will be scheduled in accordance with the job specifications.

In step S3, the properties of the scheduled sheets are read, and on the basis of this information it is determined in step S4, which setting options are still available. For example, it the job specifications prescribe that all sheets have to be of a media type for which only the lowest fuse temperature "1" is permitted, then the settings with the fuse temperatures "2", "3", "4" are eliminated, which significantly reduces the number of possible settings that have to be tested. Similarly, if the job specifications require duplex printing for the entire job, and the job consists of an even number of pages, then there will be no sheets with an image on only one side, so that the simplex mode is not an option. In a more complex printing system, there may also be a conflict between certain choices of different setting parameters, so that certain settings can be excluded from consideration even if they would match the job specifications. For example, when the maximum printing speed in the colour mode is smaller than the maximum speed in the black-white mode, then the choice of "colour printing" might conflict with the choice of the highest fuse temperature, because the sheets would be over-heated due to the low speed with which they pass through the fuse station. Thus, the step S4 limits the settings to be considered to a set of settings consisting only of those settings which are actually possible and allowable for at least one of the sheets in the sequence.

Then, in the subsequent steps S5-S9, the settings manager 40 will test the settings one after another. When all settings have been tested (answer "N" in step S9), a predicted time to finish will have been calculated for each setting, and these times to finish are compared to one another and the setting with the smallest time to finish is selected in step S10. Then, before the first sheet of the scheduled sequence is supplied to the print station, the printer is switched to the selected setting, and this setting will be applied for all sheets in the sequence, unless the properties and/or job specifications for an individual sheet enforce a temporary change to a different setting.

In an alternative example, the printing system is controlled in a batch mode, i.e. a number b of sheets that correspond to the size of the buffer is treated as a batch to which the steps S1-S10 are applied before a next batch is processed in the same way. In a further alternative embodiment, a continuous mode may be used wherein the step S2 consists only in adding a few additional sheets to a sequence that had been scheduled before. On the other hand, all sheets that have been printed already at that time will be removed from the sequence. Then, the steps S3-S10 will be applied to the updated new sequence. In this case step S10 may imply a change to a different setting, and the new setting will be applied to all sheets that have not yet been printed.

However, in the embodiments that have been described so far, the setting that is selected in step S10 will always apply to all the sheets in the sequence, unless, in the continuous mode, the sheets that are added to the sequence in step S2 result in a change in the setting which will then, again, apply to the entire sequence.

In some cases, it may be possible to enhance the productivity even further by dividing a large sequence into a number of smaller sub-sequences and by applying different settings to each sub-sequence. This may for example be the case when the size b of the sheet buffer is very large and/or comprises two or more print jobs. As an example, consider a 16-sheet sequence that contains the sequence of sheets shown in FIG. 5 in the first part and then the sequence of sheets shown in FIG. 6 in the second part. Then, trying to find an optimal setting for the entire sequence would not always provide the best result.

Furthermore, in some situations it may be advantageous to rearrange an order of such sub-sequences. For example, when a sequence consists of a one sheet duplex job, followed by an eight sheet simplex job which is followed by a one sheet duplex job, it is advantageous to swap the second and third jobs. Without rearranging the order of the jobs a duplex to simplex switch is required between the first and second job, as well as a simplex to duplex switch between the second and third job. Swapping the second and third job will remove a switch and therefore the time required to perform the switch.

Although it is usually undesirable to rearrange the order of sheets within a single job, the invention is not necessarily limited to only rearrange sub-sequences that each correspond to one or more complete jobs.

Figure 8:
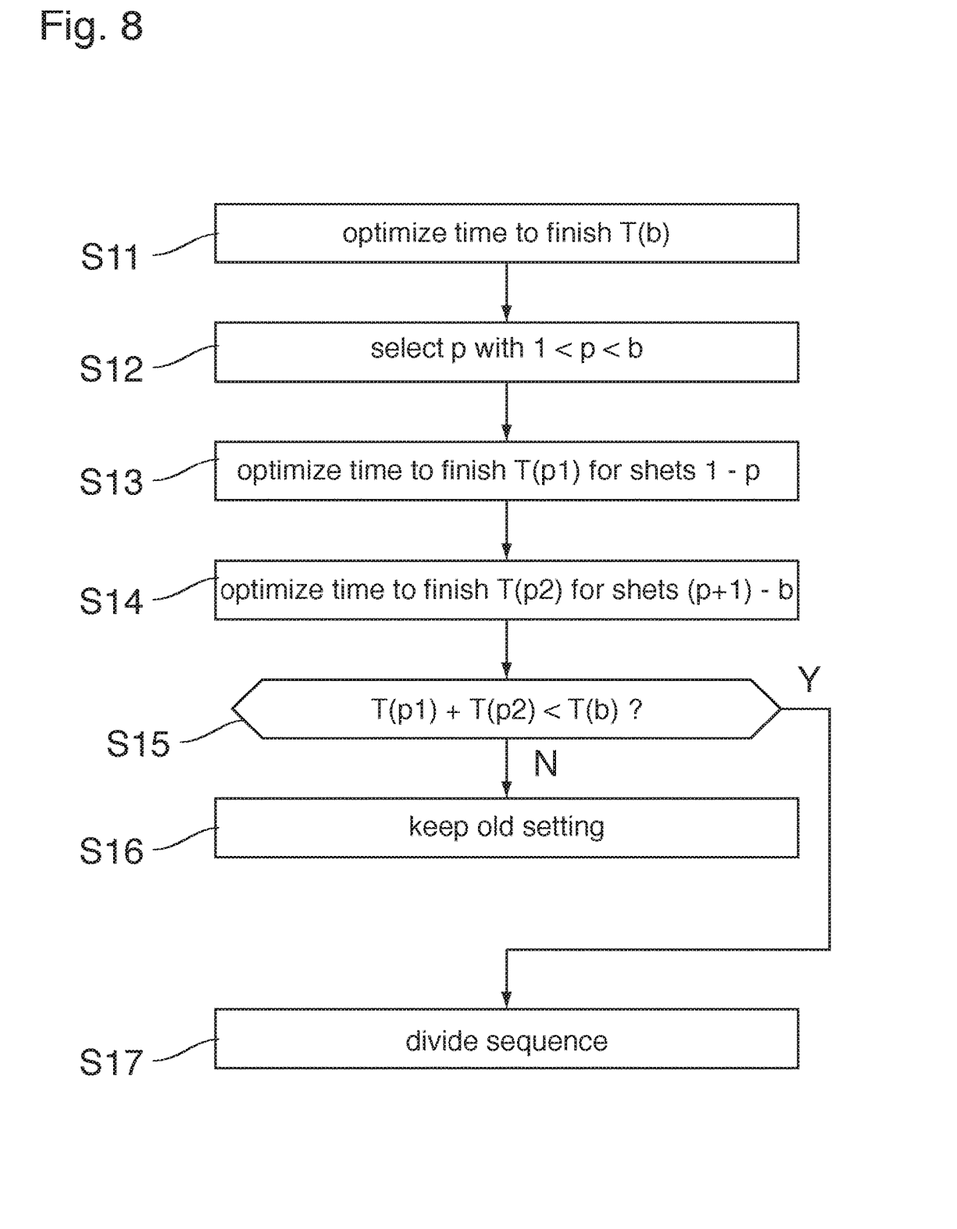

FIG. 8 illustrates a further development of the control method according to the invention, which permits to divide a sequence into sub-sequences.

Step S11 in FIG. 8 is equivalent to performing the method as shown in FIG. 7 for an entire page buffer that contains b pages, thereby to find a setting that results in an optimal time to finish T(b) for the complete sequence.

Then, a number p between 1 and b is selected in step S12. For example, p may be a number that is close to b/2, so that the sequence (with the length b) is divided into two sub-sequences of approximately equal lengths. If the sheet buffer contains two or more jobs or repetitive patterns have been recognized in the sequence, it may be advantageous to select p at a boundary between successive jobs or between different repetitive patterns. Furthermore, a boundary between two consecutive sheets with at least one property (sheet property or job property) differing is a candidate for dividing a sequence in sub-sequences.

Then, in step S13, the procedure illustrated in FIG. 7 is applied to the first sub-sequence, i. e. to the sheets 1 to p, and in step S14 it is applied to the second sub-sequence (sheets p+1 to b). In this way, one obtains a setting that gives an optimal time to finish T(p1) for the first sub-sequence, and a (possibly different) setting that gives an optimal time to finish T(p2) for the second sub-sequence.

It is advantageous to first calculate an optimal time to finish T(p1) for the first sub-sequence, and only then an optimal time to finish T(p2) for the second sub-sequence as this allows to take into account a setup time DT(1) for the second sub-sequence as this setup time DT(1) not only depends on the settings for the second sub-sequence, but also on the settings for the first sub-sequence. Note that DT(1) for the first sub-sequence is determined by the current settings and the settings for the first sub-sequence.

In step S15 the sum of the two times to finish T(p1) +T(p2) is compared to the time to finish T(b) that had been found in step S11. If the sum of the two former times to finish is not smaller than T(b) (result N in step S15), then the setting that had been found in step S11 is kept in step S16. Otherwise (Y in step S15), the original sequence is divided into the two sub-sequences in step S17, and the settings that have been found steps S13 and S14 are applied to the respective sub-sequences.

Optionally, in order to improve the productivity even further, the procedure shown in FIG. 8 may be repeated for different choices of p, and an overall optimum may be searched for. Further, it is possible to iterate the procedure by dividing, for example, each of the two sub-sequences into a respective pair of sub-sub-sequences, and so on.

Figure 9:
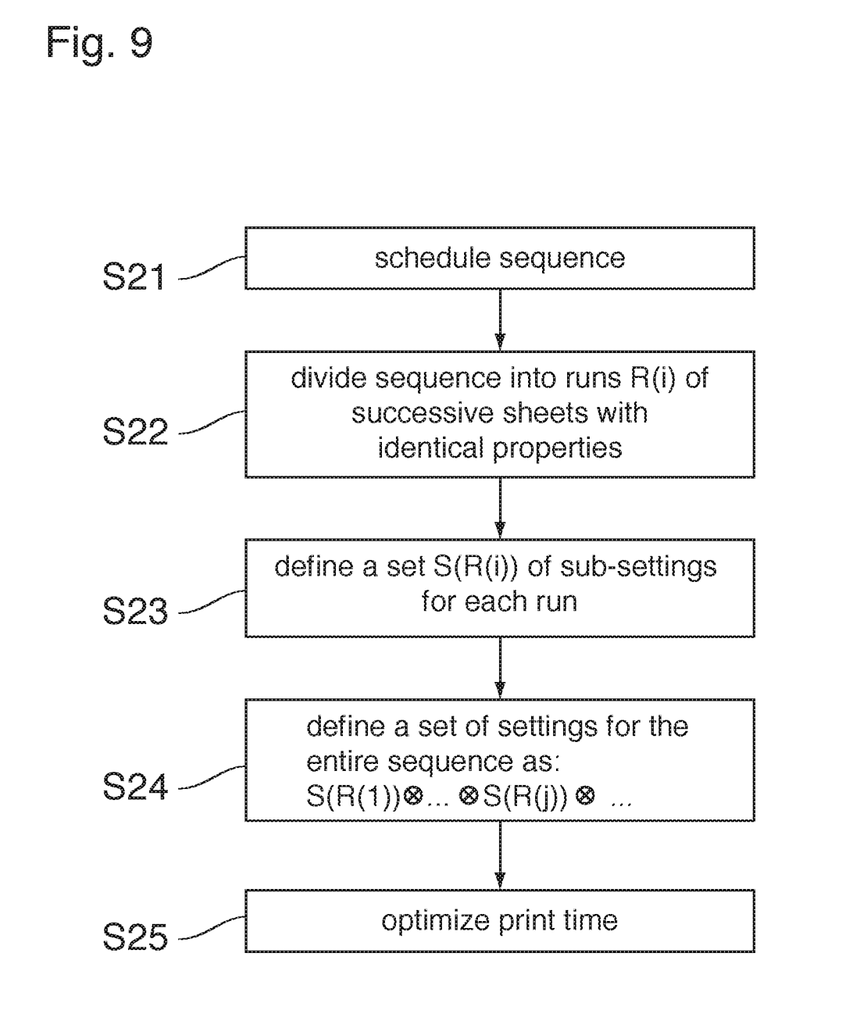

Another possible approach has been illustrated in FIG. 9. Here, a sequence filling the entire sheet buffer is scheduled in step S21. In principle, the properties of the sheets in this sequence may all be different from one another. In practical applications, however, the most frequent case will be that a run of two or more successive sheets have the same properties and differ only in the contents to be printed thereon, e. g., all sheets have the same media type and the same format and are designated as duplex sheets.

In step S22, the entire sequence is divided into runs R(i) of successive sheets with identical properties. For example, in the sequence shown in FIG. 5, the first five sheets 56*a* would form a first run R(1), and the last three sheets 56*b* would form a second run R(2). In contrast, the sequence in FIG. 6 would be divided into six runs consisting each of only one sheet, and another run consisting of the last two sheets.

In an alternative embodiment, rather than dividing the sequence into runs of sheets with identical properties, the sequence might be divided into runs that consist of repeating patterns. In that case, the first six sheets in FIG. 6 would form a first run, and the last two sheets would form a second run.

Then, in step S23, a set S(R(i)) of possible, non-conflicting settings (designated as "sub-settings" here) is assigned to each of the runs R(i). As far as an individual run is concerned, this step 23 corresponds to step S4 in FIG. 7. However, a sub-setting will only be eliminated from the set if it conflicts with the job specifications for all the sheets in the run or includes conflicting setting parameters.

In step 24 a set of possible settings for the entire sequence is defined in step S24 by forming the product set S(R(1))* ... *S(R(i))* ... of all the sets S(R(i)) that have been defined in step S23. The sign "*" designates the set product. For example, when A is a set containing a number r of elements $a_i$, i=1 ... r, and B is a set containing a number s of elements $b_j$, j=1 ... s, then the product A*B is the set containing as elements the r·s pairs $(a_i, b_j)$. For example, considering a sequence that consists of only two runs, and considering the settings (3, 1, 1) and (4, 1, 1) shown in FIG. 5 as possible sub-settings for both runs, then the set defined in step S24 would include among others a setting (4, 1, 1; 3, 1, 1) specifying sub-setting (4, 1, 1) for the first run and the sub-setting (3, 1, 1) for the second run, and another (but different!) setting (3, 1, 1; 4, 1, 1).

Then, in step S25, the procedure according to steps S5 to S10 in FIG. 7 is applied to the product set that has been defined in step S24.

The method shown in FIG. 9 may require more computing power but has the advantage that it provides not only optimal settings but also a (close to) optimal division of the sequence in two sub-sequences with different settings.

What is claimed is:

1. A method of controlling a printing system comprising a number of functional components including a print station disposed at a sheet transportation path, the printing system being arranged to process a sequence of media sheets and is operable with a finite number of different settings, wherein a setting corresponds to an operational mode of a functional component, the method comprising
   a) calculating a time to finish that will be needed for processing the sequence;
   b) scheduling a sequence of sheets for printing;
   c) defining a set of possible settings for processing the scheduled sequence;
   d) calculating a time to finish for each setting in the defined set;
   e) selecting the setting with the smallest time to finish; and
   f) processing the sequence with the selected setting comprising supplying the sheets in the sequence as scheduled into the sheet transport path, and the print station forming a corresponding image on each sheet wherein the functional components are operated according to the mode of operation determined by the selected setting.

2. The method according to claim 1, wherein each setting is designated by a vector with a finite number of components, each component of the vector corresponding to a setting parameter of the printing system.

3. The method according to, claim 2, wherein one setting parameter is a fuse temperature or printing speed.

4. The method according to claim 2, wherein one setting parameter is a parameter specifying duplex or simplex printing.

5. The method according to claim 2, wherein one setting parameter specifies a color mode of the printing system.

6. The method according to claim 1, wherein the step (b) comprises scheduling a number of sheets that corresponds to only a part of a print job.

7. A printing system arranged to process a sequence of media sheets and operable with a finite number of different settings, comprising:
   a controller capable of calculating a time to finish that will be needed for processing the sequence,
   wherein the controller is configured to perform the method according to claim 6.

8. A computer program product embodied on a non-transitory computer-readable medium and comprising program code, the program code, when executed on a controller of a printing system, causing the controller to perform the method according to claim 6.

9. The method according to claim 1, wherein the step (b) comprises scheduling a number of sheets that contains all the sheets of at least one entire print job.

10. The method according to claim 1, wherein the step (f) comprises processing selected ones of the sheets in the sequence with a setting different from the setting selected in step (e), in accordance with given printing instructions for these sheets.

11. The method according to claim 1, comprising a step of dividing the sequence scheduled in step (b) into sub-sequences and repeating the steps (c) to (f) for each sub-sequence, and a step of deciding whether to keep the setting that has been selected for the entire sequence or select different settings for each sub-sequence.

12. A printing system arranged to process a sequence of media sheets and operable with a finite number of different settings, comprising:
   a controller capable of calculating a time to finish that will be needed for processing the sequence,
   wherein the controller is configured to perform the method according to claim 11.

13. A computer program product embodied on a non-transitory computer-readable medium and comprising program code, the program code, when executed on a controller of a printing system, causing the controller to perform the method according to claim 11.

14. The method according to claim 1, comprising a step of dividing the sequence scheduled in step (b) into sub-sequences, wherein one of the settings of step (c) comprises the order in which to process the sub-sequences in step (f), and wherein step (f) further comprises processing the sequence with the selected ordering setting.

15. A printing system arranged to process a sequence of media sheets and operable with a finite number of different settings, comprising:
   a controller capable of calculating a time to finish that will be needed for processing the sequence,
   wherein the controller is configured to perform the method according to claim 14.

16. A computer program product embodied on a non-transitory computer-readable medium and comprising program code, the program code, when executed on a controller of a printing system, causing the controller to perform the method according to claim 14.

17. A printing system comprising a number of functional components including a print station disposed at a sheet transportation path, the printing system being arranged to process a sequence of media sheets and operable with a finite number of different settings, wherein a setting corresponds to an operational mode of a functional component, the printing system comprising:

a controller capable of calculating a time to finish that will be needed for processing the sequence, wherein the controller is configured to perform the method according to claim 1.

18. A computer program product embodied on a non-transitory computer-readable medium and comprising program code, the program code, when executed on a controller of a printing system, causing the controller to perform the method according to claim 1.

\* \* \* \* \*